UNITED STATES PATENT OFFICE.

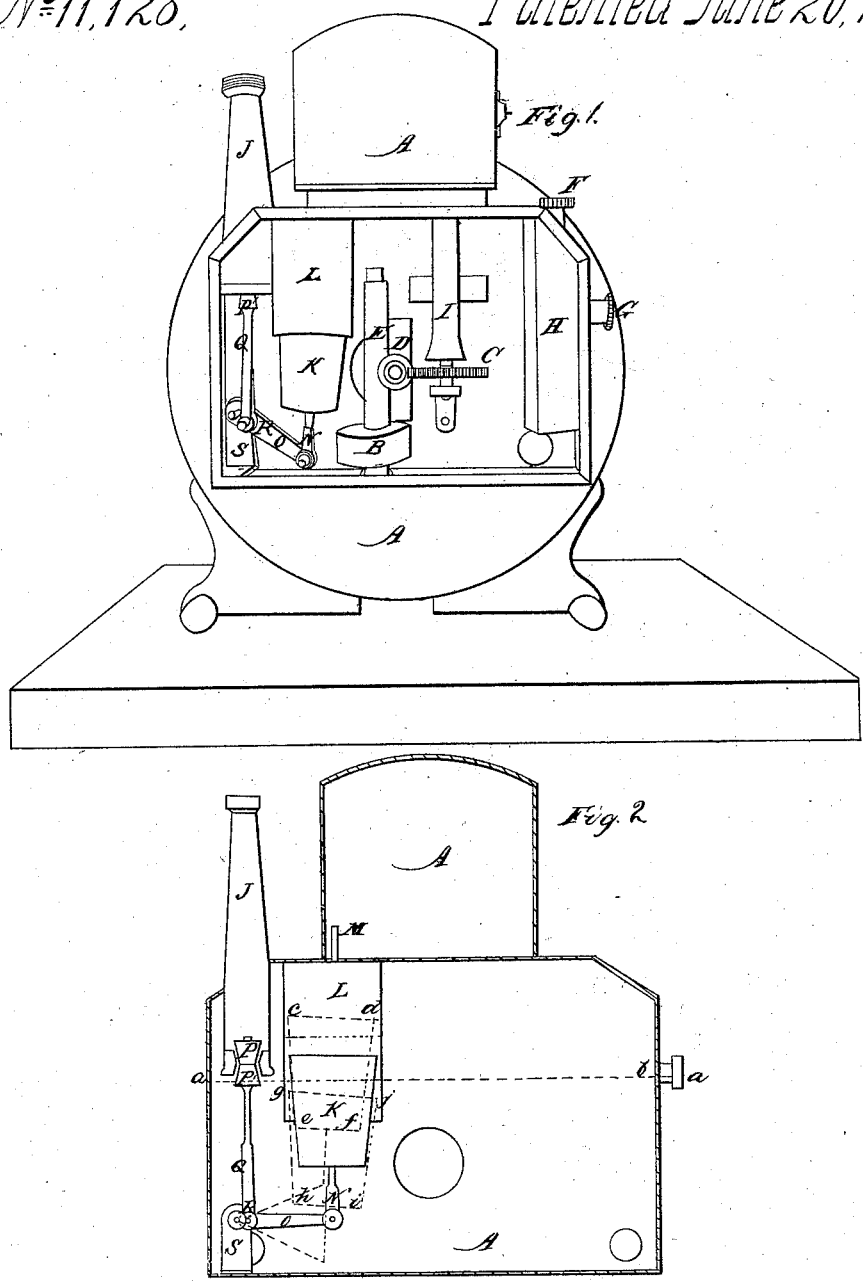

CHARLES C. LLOYD, OF WEST PHILADELPHIA, PENNSYLVANIA.

IMPROVEMENT IN GAS METERS AND REGULATORS.

Specification forming part of Letters Patent No. 11,128, dated June 20, 1854.

*To all whom it may concern:*

Be it known that I, CHARLES C. LLOYD, of West Philadelphia, in the county of Philadelphia and State of Pennsylvania, have invented a new and useful Improvement in Gas-Meters; and I do hereby declare that the following is a full, clear, and exact description of the construction and operation of the same, reference being had to the annexed drawings, making a part of this specification, in which—

Figure 1 is a perspective view of a gas-meter with the improvement applied, and Fig. 2 a vertical section showing more especially the construction and application of the said improvement.

Like letters indicate like parts in the two figures.

A A is the case; B, the dry-well; C, the wheel connecting with and operating the dial-works; D, the spiral worm which connects the drum (not shown in the drawings) with and operates the wheel C; E, the inlet-pipe leading to the dry-well and by the bent tube (not shown in the drawings) to the drum; F, the tube for introducing the water; G, the water-line outlet-tube; H, the chamber for preventing the gas from escaping by the tubes F and G; I, the pipe for preventing the gas from escaping through the dial-case, and J the supply-pipe through which the gas enters the meter.

The several parts above referred to are common to almost all gas-meters. To the supply-pipe on the outside of the meter a governor operated by a float is sometimes applied for regulating and equalizing the pressure of the gas within the meter, while another float connected with the inlet-valve in the supply-pipe in the inside of the meter is always applied for stopping off the flow of gas into the meter when the water gets too low therein.

The nature of my invention consists in producing in the inside of the meter these two effects by one float—viz., causing one float to effect the double purpose of regulating or equalizing the pressure of the gas within the meter and also of stopping off the flow of gas into the meter when the water gets too low therein.

I will now preceed to point out and describe my improvement and the parts connected therewith.

K is the float; L, a guide chamber reaching below the water-line, (within which chamber the float is adapted to move freely,) having a small tube, M, open at each end and reaching up into the dial-case. Attached to the bottom of this float is a stem, N, jointed to a lever, O, whose fulcrum rests in the stationary piece S.

Within the supply-pipe J and near its lower end and within the meter is made to operate a double valve, P P', of any suitable form, and connected by a rod, Q, with the said lever by a joint or pivot, R. These valves and their seats are properly adapted to each other, and so arranged and connected with the lever O and float K as to diminish one of their apertures when the pressure of gas is increased and to close the other when the water is too low in the meter.

I will now proceed to describe the mode of operation of my improvement.

We will suppose the dotted line *a b* to be the proper water-line, and that the float K is in the position it would be before the gas enters the meter, and that the valves P P' are both about equally open. If the gas is now admitted, the water will be forced up in the guide-chamber L, carrying the float with it, (the air escaping through the tube M,) and consequently diminishing the opening in the lower valve, P', and the flow of gas into the meter, in which case the float would be in the position shown by the dotted lines *c d e f*. Again, if we suppose the water getting too low in the meter, the float necessarily sinking with it, the opening in the upper valve, P, will be diminished and the flow of gas retarded, and increasingly as the water-line is lowered, until the valve is closed and the flow of gas stopped, which would take place when the float has been lowered to the position shown by the dotted lines *g h i j*, the water-line being still high enough to prevent the gas from escaping by any other course than through the bent tube to the drum. In Fig. 1 the float is shown as down and the upper valve, P, closed, as the meter is represented in the drawings as without water. While gas is flowing through the meter, the lower valve, P', can never close entirely, though its range of motion is very short; but it is obvious that as the pressure is increased so will the orifice of the valve be diminished; and this is a very necessary and important effect in practice, inasmuch as the density of the gas passing through the drum is at all times, by means of my improvement, kept about the same, notwithstanding any variation of pressure at the gasometer, and this advantage being obtained in a much more simple, compact, convenient, and economical manner than by any other arrangement heretofore known.

I do not claim as my invention the combination of a float with a water-valve only, as this is common; nor do I claim the combination of a float with a valve, so as to operate simply as a governor, as this is also common; but

What I claim as my invention, and desire to secure by Letters Patent, is—

The application of the principle or mode of operation herein described, whereby the double purpose is effected of equalizing or regulating the pressure of the gas within the meter and of shutting off the gas when the water gets too low by combining the valves with one and the same float, all within the meter, substantially and for the purposes as herein described.

CHAS. C. LLOYD.

Witnesses:
J. C. COLTON,
BENJ. MORISON.